April 20, 1926.
A. E. FEIGE
1,581,108
DISPLAY STAND FOR HOSE CLAMPS
Filed Oct. 19, 1922
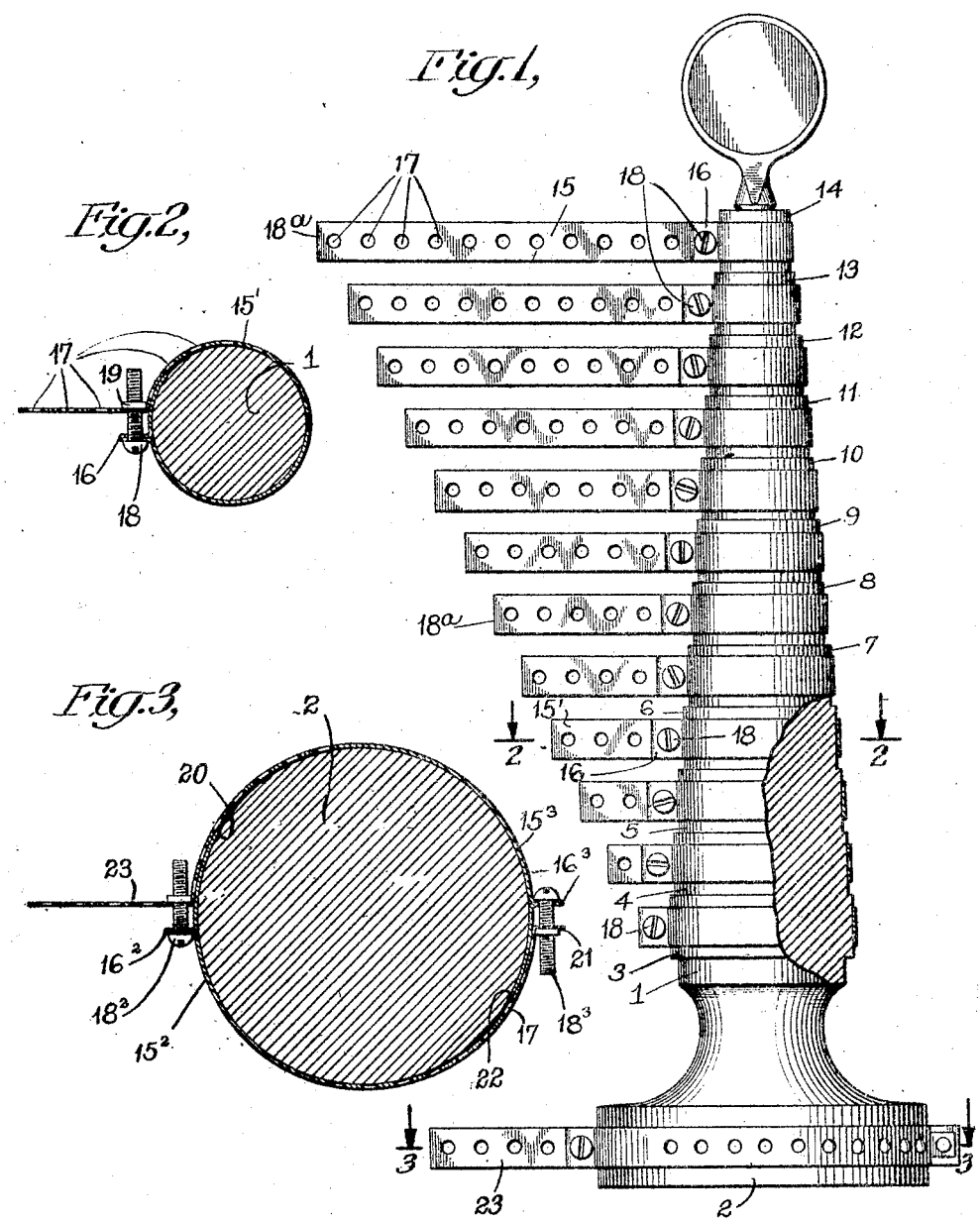

Patented Apr. 20, 1926.

1,581,108

UNITED STATES PATENT OFFICE.

ADOLPH E. FEIGE, OF HACKENSACK, NEW JERSEY, ASSIGNOR TO UNIVERSAL INDUSTRIAL CORPORATION, OF HACKENSACK, NEW JERSEY, A CORPORATION OF DELAWARE.

DISPLAY STAND FOR HOSE CLAMPS.

Application filed October 19, 1922. Serial No. 595,524.

*To all whom it may concern:*

Be it known that I, ADOLPH E. FEIGE, a citizen of the United States, and resident of Hackensack, county of Bergen, and State of New Jersey, have invented certain new and useful Improvements in a Display Stand for Hose Clamps, of which the following is a specification.

The invention relates to a display stand for hose clamps and particularly to a device whereby hose clamps, comprising flexible metal ribbons, may be displayed for sale in a manner which is at once attractive and which displays the capabilities of the articles.

In the device the stand embodies a vertical column having portions of various diameters about which duplicate hose clamps are secured with the free ends thereof extending outwardly in parallel relation. The clamps which are to be displayed are provided with equally spaced openings extending back from one end of the metal strip, and each clamp is adapted to be secured about hose or other cylindrical objects of different diameters by extending a bolt or the like through one or another of the openings referred to. In the present invention the diameters of the portions of the stand about which the various clamps are secured are so calculated that the bolts of the various clamps, extending from shoulders adjacent to the opposite ends of the clamps, will be inserted into different ones of the openings referred to. The portions of the stand or column about which the clamps are secured are so stepped or graduated as to cause the free ends of the displayed clamps to extend outwardly different distances from the stand, the outer ends of the displayed clamps extending in a slanting or other regular or symmetrical line, so as to display the goods effectively and attractively.

In order that the invention may be more clearly understood, attention is hereby directed to the accompanying drawings forming part of this application and illustrating a preferred form of the invention. In the drawings, Fig. 1 represents a front elevation of the display stand with a plurality of hose clamps mounted thereon in display position, the drawing being shown partly broken away and illustrated in section, and Figs. 2 and 3 are horizontal sections taken respectively on lines 2—2 and 3—3 of Fig. 1.

Referring to the drawings, the stand illustrated comprises a vertical column 1 having a base portion 2, preferably cylindrical. The column is provided with cylindrical portions of stepped or graduated diameters 3, 4, 5, etc., the stand illustrated having twelve steps which I have numbered 3 to 14 inclusive. These steps are graduated in size, so as to decrease in diameter by equal amounts from the bottom to the top.

The clamps to be displayed, one for each of the steps of the display device are illustrated as duplicates each of the other. Each of these clamps, such as the clamp 15 shown at the top of the stand, or the clamp $15^1$ shown as secured about the step 6 of the display stand, comprises a flexible metal ribbon having a shoulder or outstanding flange 16 adjacent one end. The metal ribbon is provided with a series of openings 17 extending back from the opposite end, $18^a$, of the ribbon, these openings 17 being equally spaced apart.

When any clamp such as the clamp $15^1$ is to be positioned about a step of the display device such as the step 6, the clamp is positioned around the step of the stand and the bolt 18 slipped through the opening in shoulder 16 and through the aligned opening 17, after which the nut 19 may be drawn up on the bolt to secure the clamp tightly about the desired step of the stand. It will be understood that the end portion of the ribbon containing openings 17 is lapped over the opposite end of the ribbon, as is indicated in Fig. 2, and that the free portion of the ribbon, containing a greater or less number of openings 17, in accordance with the diameter of the portion of the stand about which the ribbon is wrapped will be bent outwardly, as is indicated in Fig. 2, into a position parallel with the shoulder 16. This is the same operation which is followed in clamping the devices about hose or other objects of different diameters. In the case of clamping hose, or the like, however, the free ends of the clamps may be cut off and thrown away, whereas in the case of the display stand herein described the free ends of the clamps are left outstanding for display purposes.

In the preferred form of the device the steps of the display stand are so graduated that the periphery of each step is greater or less than the periphery of each other step by an even multiple of the distance between each adjacent pair of openings 17 in each of the clamps. By suitably graduating the steps 6 the free, outstanding portions of the clamps may be displayed in a symmetrical or regular arrangement, which will display the clamps attractively. Thus the outer ends 18 of the strips will all lie in, or be bounded by a geometric curve, such as a straight inclined line in the form of the device illustrated. In the preferred form of the device, as illustrated, the periphery of each step of the stand is less than the periphery of the step immediately below the same, an amount which is equal to the distance between a pair of adjacent holes 17. Therefore, the bolts 18, all of which are positioned adjacent to the steps of the stand, will extend in a straight slanting line and the outer ends 18a of the clamps will extend in another slanting line, as illustrated. The stand may be provided with a number of steps equal to the number of openings 17 in each of the clamps, as illustrated, in which case the bottom clamp will have its bolt 18 extend through the outermost opening 17 of the clamp, while the bolt 18 of the uppermost clamp will extend through the innermost hole 17 of that clamp.

In the form of device illustrated the base 2 is considerably larger in diameter than any of the steps of the stand, as described, and this base may be utilized to display a plurality of clamps secured together. Thus in Figs. 1 and 3 a pair of clamps are shown secured together and displayed around the base 2 of the stand. One of the clamps $15^2$ starts from the end 20 adjacent to which is formed the shoulder $16^2$, the opposite end of this clamp being bent outwardly, as shown at 21, a distance sufficient to contain one of the openings 17. The other clamp $15^3$ starts from the end 22, which is lapped by the end portion of the other clamp containing the bent out end 21. The clamp $15^3$ is provided with the shoulder $16^3$ adjacent to the bent out end 21 of the other clamp, clamp $15^3$ overlapping the initial end portion 20 of the first clamp and having its free end bent out, as is indicated at 23, adjacent to shoulder $16^2$. The clamps are secured together by bolts $18^2$ and $18^3$ respectively.

It should be understood that the invention is not limited strictly to the details of the construction which has been particularly described, but that the same is as broad as is indicated by the accompanying claim.

What I claim is:

In a display device, a stand comprising a vertical column having the greater part of its length provided with consecutive cylindrical portions of different diameters, the diameters of said portions being graduated regularly, with respect to each other, said portions being adapted to have clamped thereabout metallic ribbon clamps having equally spaced apertures therein, the perimeter of each portion differing from that of the next by the distance between a pair of apertures in one of such clamps.

In testimony whereof I have signed my name to this specification.

ADOLPH E. FEIGE.